(12) United States Patent
Muller

(10) Patent No.: US 6,842,452 B1
(45) Date of Patent: Jan. 11, 2005

(54) METHOD FOR SWITCHING DATA STREAMS

(75) Inventor: Nimrod Muller, Migdal Tefen (IL)

(73) Assignee: Intel Corporation, Santa Clara, CA (US)

(*) Notice: Subject to any disclaimer, the term of this patent is extended or adjusted under 35 U.S.C. 154(b) by 646 days.

(21) Appl. No.: 09/712,185

(22) Filed: Nov. 15, 2000

(51) Int. Cl.⁷ .............................................. H04L 12/28
(52) U.S. Cl. ...................................... 370/389; 370/390
(58) Field of Search ................................ 370/259, 260, 370/261, 262, 263, 264, 270, 356, 390, 400, 396, 701, 352, 397, 401, 265, 389; 709/241, 238

(56) References Cited

U.S. PATENT DOCUMENTS 6,404,746 B1 * 6/2002 Cave et al. ................. 370/262
6,463,053 B1 * 10/2002 Chen .......................... 370/352
6,606,668 B1 * 8/2003 MeLampy et al. .......... 709/241
6,636,504 B1 * 10/2003 Albers et al. ................ 370/352
6,671,272 B2 * 12/2003 Vaziri et al. ................. 370/352
6,687,360 B2 * 2/2004 Kung et al. ............. 379/211.02

* cited by examiner

*Primary Examiner*—Douglas Olms
*Assistant Examiner*—Ricardo M. Pizarro
(74) *Attorney, Agent, or Firm*—Alan Pederson-Giles

(57) ABSTRACT

A method of placing a first call to a designated number to retrieve a voice message over a packet switched network. The voice message is retrieved from a computer and a specific code is entered to prompt the computer to call an originator of the retrieved voice message. A second call is placed, via the computer, to the originator of the retrieved voice message. The call information of a packet carrying voice information of the first call is changed to correspond with call information of the second call when the packet is sent from the first call to the second call.

26 Claims, 5 Drawing Sheets

METHOD FOR SWITCHING DATA STREAMS

BACKGROUND OF THE INVENTION

1. Copyright Notice

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

2. Field of the Invention

The present invention, in certain respects, relates to Internet Protocol telephony. In other respects, the present invention relates to a method of bridging Internet Protocol based voice calls.

3. Description of Background Information

Voice, fax and other forms of information have traditionally been carried over dedicated circuit-switched connections of a public switched telephone network (PSTN). Circuit-switched calls use pulse code modulation (PCM) to transmit analog data over the PSTN in digital form.

In order to make a voice call over an IP network, the PCM data of the PSTN has to be encoded to a packet form. One method that a user may use to communicate in a voice call over an IP network is to place a call over the PSTN. The PCM data would be encoded to one or more packets via a gateway device and sent over a packet switched network. A networked server would receive the packet encoded voice signals of the user from the gateway device. In this manner, a user may call a designated number to reach the networked server to receive voice mail messages. The user may decide to call the person who left the message while listening to the voice message. This could be accomplished by the user entering a special code; thus, causing the server to make a second call to the person who left the voice message. However, in order for the user on the first call and the user on the second call to communicate with each other, the server must bridge the two calls. To bridge the calls, the server decompresses the encoded voice signal from the first call user. The voice signal is converted back to PCM format and then switched over a time division multiplexing (TDM) bus that carries PCM data. The data from the TDM bus is then compressed and encoded back to packet form and transmitted over the network to the second call user. Similar to the actions used to transmit the voice signal of the first user call, the server must decompress the voice signal from the second call user. The decompressed voice signal of the second caller is switched over a TDM bus, and then encoded back into a packet form to be transmitted to the first caller.

Using this process to bridge voice calls, it is necessary to encode and decode the voice data twice for each IP call, which results in increased latency in the network. What is needed is an efficient and effective way to bridge voice stream data over a network with a minimum latency.

DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION

Figure 1:
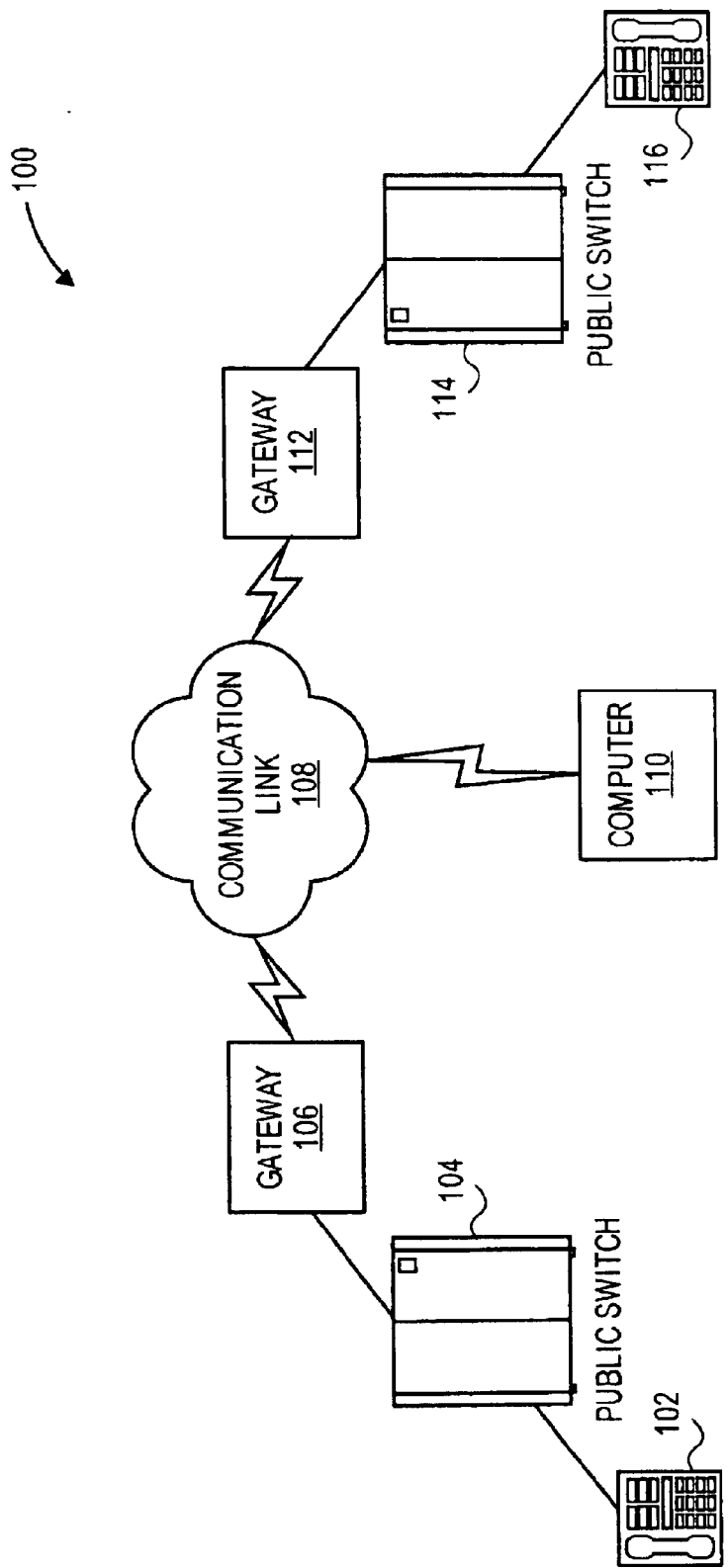
FIG. 1 illustrates an embodiment of the present invention.

Various applications of the present invention may, for example, include voice message and voice message retrieval. FIG. 1 is a diagram illustrating an embodiment 100 of a networked system of the present invention. The illustrated embodiment 100 includes a first call from a source 102 to a designated number of a gateway 106 via a public switched telephone network (PSTN) 104 to retrieve a stored voice message. The call to the designated number would pass through a local gateway 106, for example, a Cisco® 5300 gateway, manufactured by Cisco Systems®, to be converted from PSTN format to a packet switched protocol such as an real-time transfer protocol (RTP). RTP is based upon the protocols Internet protocol (IP) and User Datagram Protocol (UDP). Once converted to an IP, the first call is directed, via a communications link 108, to computer 110. Computer 110 receives the first call to allow the user to retrieve the stored voice message. During the playback of the voice message, the user has the option of calling the originator of the retrieved voice message. When this option is elected, computer 110 places the first call in a hold status to place a second call to the originator of the retrieved voice message 116 via a gateway 112. Once computer 110 dials the number of the originator of the retrieved voice message 116, computer 110 bridges the first call and second call together.

Figure 2:
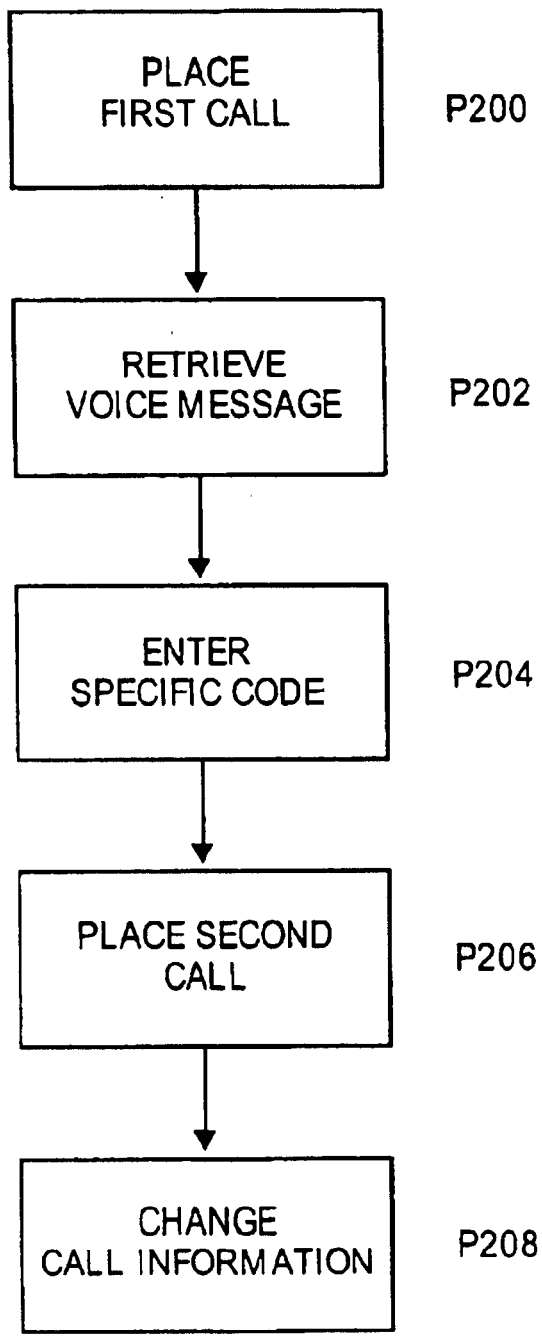
FIG. 2 is a flow diagram explaining the operation of an embodiment of the present invention.

FIG. 2 is a flow diagram to explain the operation of an embodiment of the present invention. At P200 a designated number is dialed to place a first call to retrieve a stored voice message over a packet switched network from computer 110. The first call, which includes pulse code modulation (PCM) continuous speech data, may be converted from a circuit switched connection on the public switched telephone network to encoded packets using the real-time transport protocol (RTP). RTP provides end-to-end network transport functions suitable for applications that transmit real-time data, such as audio, video or simulation data, over multicast or unicast network services. RTP is designed to be independent of the underlying transport and network layers.

At P202 a stored voice message is retrieved from computer 110. The stored voice message is sent and played over the first call to the source of the first call 102. During the playback of the retrieved voice message, a call to the originator of the retrieved voice message may be placed.

At P204 a specific code is entered by the user at the source 102 to prompt computer 110 to place a second call to the originator of the retrieved voice message 116. The specific code includes dual tone multi-frequency (DTMF) signals. At P206 a second call is placed to the originator of the retrieved voice message 116, via computer 110, in response to the DTMF signals entered by the user.

At P208 call information of a packet carrying voice information from the source of the first call 102 is changed to correspond with call information of the second call to the originator 116 when the packet is sent over the first call to the second call. When a packet is sent over the second call to first call, the call information of the packet carrying voice information from the second call is changed to correspond to call information of the first call. The call information may include a destination address, as a part of an IP header, and a synchronization source identifier, as a part of a RTP header.

Figure 3:
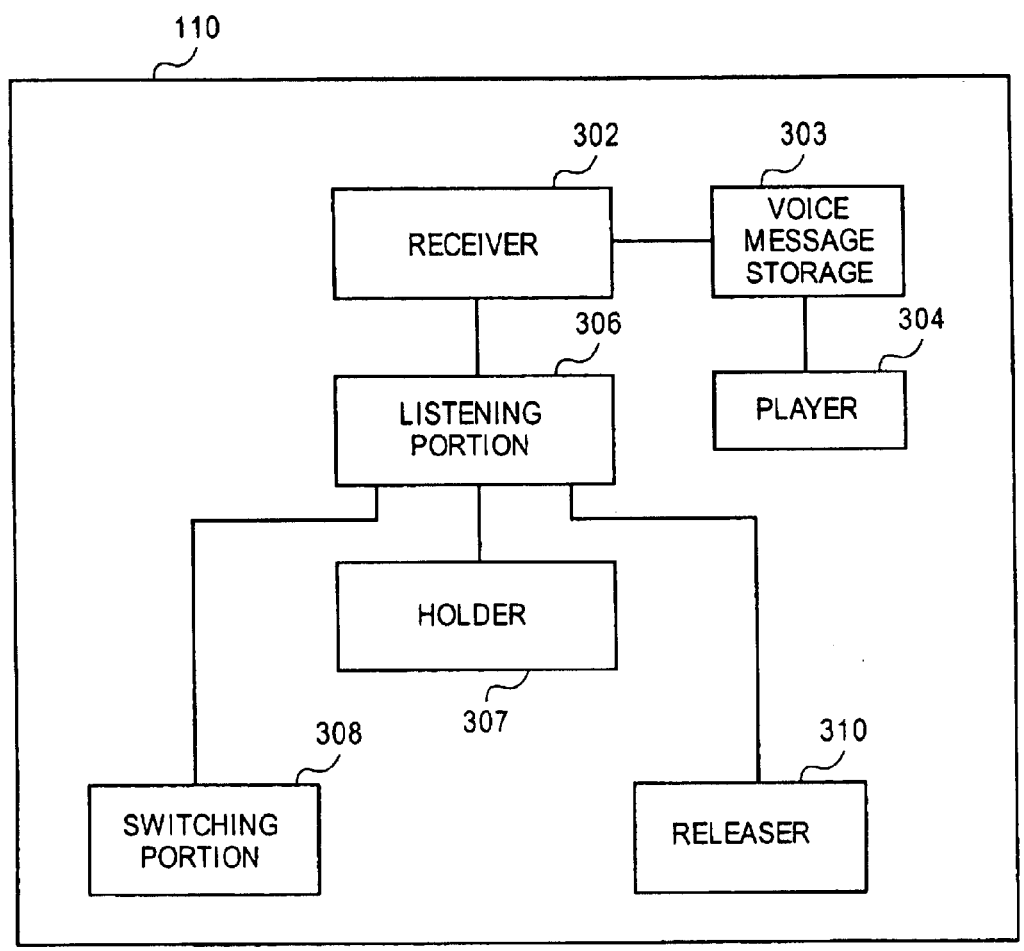
FIG. 3 illustrates an embodiment of the present invention in which a computer arrangement is shown.

FIG. 3 illustrates an embodiment of the present invention in which a computer arrangement is shown. Computer 110 includes a receiver 302, a voice message storage 303, a player 304, a listening portion 306, a holder 307, a switching portion 308, and a releaser 310. Receiver 302 receives, via a communications link 108, encoded packets of the first call to retrieve a voice message stored at computer 110. Player 304 plays the retrieved message from voice message storage 303 over the first call. While the retrieved voice messages are played at player 304, listening portion 306 listens for a specific code that may be entered by a user over the first call. The specific code may include dual tone multi-frequency (DTMF) signals that may be entered by a user to prompt computer 110 to initiate a second call to an originator of a retrieved voice message 116 or terminate the second call and return to a retrieved message. Holder 307 places the first call in a temporary hold status in response to the specific code entered by the user to initiate the second call 116 from the computer 110 to the originator of the voice message. The hold status is maintained until the first call and second call are bridged.

Switching portion 308 is configured to change call information of a packet carrying voice information from the source of the first call 102 to correspond with call information of the second call to the originator 116 when the packet is sent over the first call to the second call. Switching portion 308 may be configured to also change call information of a packet carrying voice information from the originator of the second call 116 to correspond with call information of the source of the first call 102 when the packet is sent over the second call to the first call. The packet may be sent over the packet switched network using a protocol such as real-time transport protocol (RTP).

Releaser 310 releases the bridge between the first call and second call when listening portion 306 detects DTMF signals that indicate that the user has selected an option to terminate the second call and return to a retrieved message.

Figure 4A:
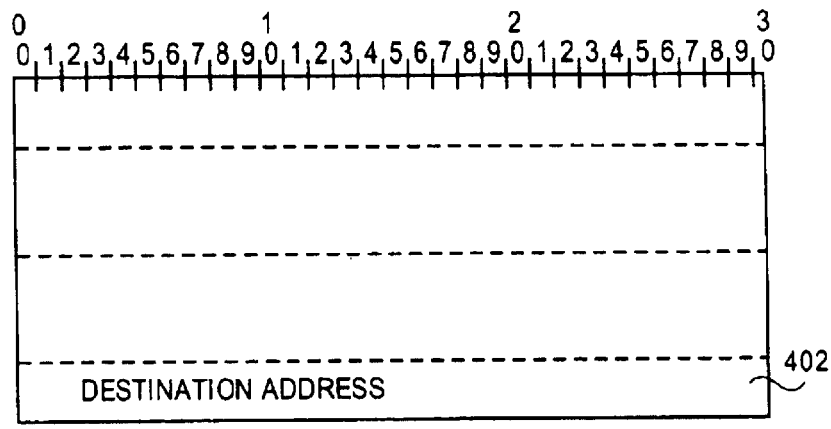
FIG. 4 illustrates protocol header fields described in an embodiment of the present invention.
Figure 4B:
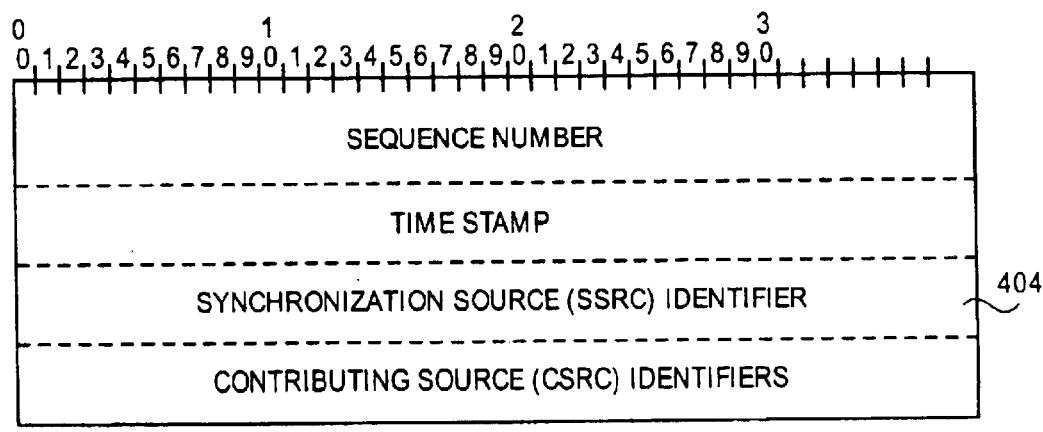

FIG. 4 illustrates protocol header fields described in an embodiment of the present invention. The call information that is changed in switching portion 308 includes, for example, a destination address 402 and a synchronization source (SSRC) identifier 404. The packets that are sent over the packet switched network use the RTP protocol. In FIG. 4(a), the packets are sent directly from the first call to the second call by changing the destination address 402 in an IP header, and modifying the SSRC identifier 404 in the RTP header, as shown in FIG. 4(b), to correspond to the SSRC of the second call. The packets may also be sent directly from second call to first call by changing the destination address 402 in an IP header, and modifying the SSRC identifier 404 in the RTP header to correspond to the SSRC of the first call.

Figure 5:
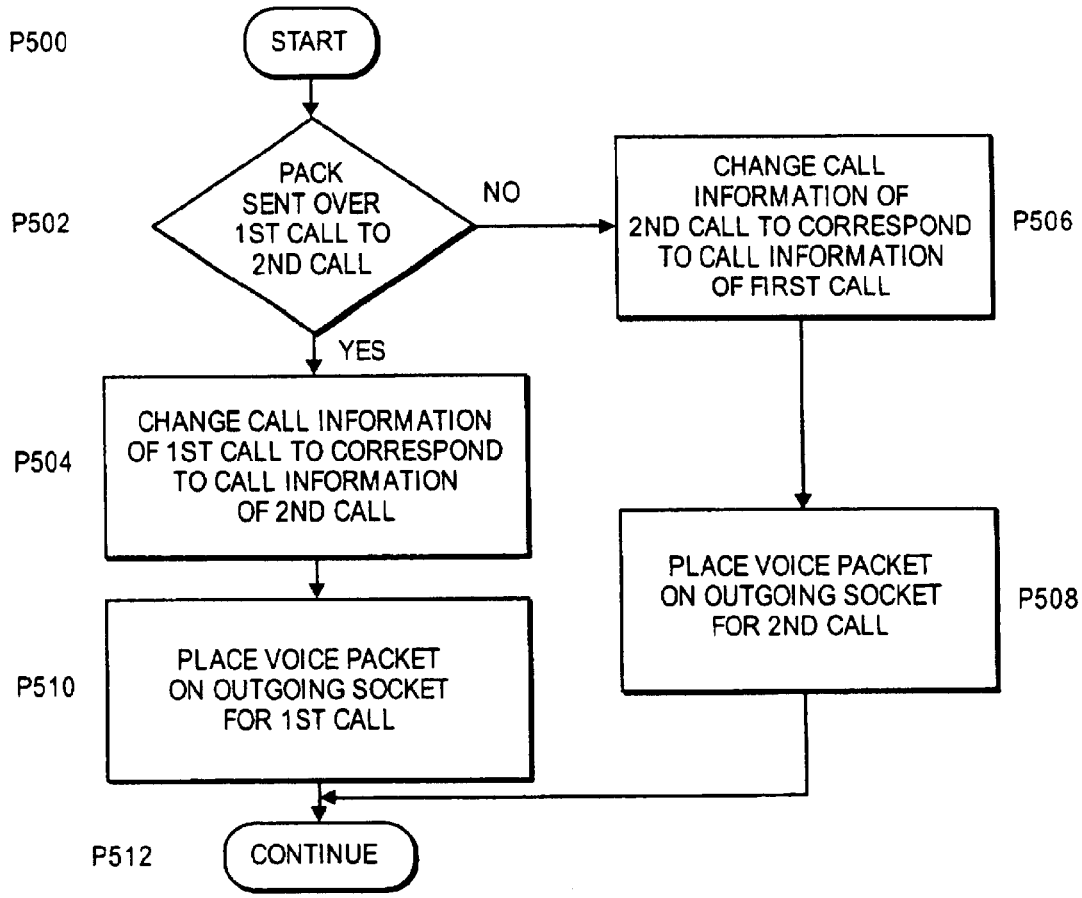
FIG. 5 explains a switching portion in an embodiment of the present invention.

FIG. 5 explains the switching portion 308 in an embodiment of the present invention. At P500 a packet carrying voice information is present at switching portion 308. At P502, it is determined whether the packet carrying voice information has been sent over the first call to the second call. If the packet has been sent over the first call to the second call, then at P504, switching portion 308 will change the call information of the packet carrying voice information from the source of the first call 102 to correspond with call information of the second call to the originator 116. At P510, the voice packet is placed on an outgoing socket for the first call to send to the second call.

At P506, if the packet has not been sent over the first call to the second call, and instead has been sent over the second call to the first call, then switching portion 308 will change the call information of the packet carrying voice information from the originator of the second call 116 to correspond to call information to the source of the first call 102. At P508, the voice packet is placed on an outgoing socket for the second call to send to the first call. At P512, the bridging is complete and the source of the first call 102 and the originator of the retrieved voice message 116 can communicate with each other.

While the invention has been described with reference to certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A method comprising:
   placing a first call to a designated number to retrieve a voice message from a computer over a packet switched network;
   retrieving said voice message from said computer;
   entering a specific code to prompt said computer to call an originator of said retrieved voice message;
   placing a second call, via a said computer, to said originator of the retrieved voice message;
   changing call information contained in a packet carrying voice information of said first call to correspond with call information of said second call when the packet is sent from the first call to the second call; and
   changing call information contained in a packet carrying voice information of the second call to correspond to call information of the first call when the packet is sent from the second call to the first call.

2. The method of claim 1, further comprising:
   converting said first call to use an internet Protocol at said computer.

3. The method of claim 2, wherein said converting comprises changing pulse code modulation continuous speech data to encoded audio packets.

4. The method of claim 1, wherein a real-time transport protocol is used to send the packet over the packet switched network.

5. The method of claim 1, wherein the call information comprises:
   a destination address; and
   a synchronization source identifier.

6. The method of claim 5, wherein the destination address of a packet containing audio data is changed in an Internet Protocol header first.

7. The method of claim 5 wherein, the synchronization source identifier is changed in a real-time transfer protocol header.

8. The method of claim 1, further comprising placing said first call in a hold status when said second call is made via the computer.

9. The method of claim 1, wherein said specific code to prompt the computer includes dual tone multi-frequency signals.

10. A computer, comprising:
    a receiving portion to receive a first call, via a network, from a user to retrieve a voice message stored on the computer;

a voice message storage portion configured to store and transmit the voice message;

a playback portion to play the voice message stored for said user;

a listening portion to listen for a specific code entered by said user;

a holding portion to place said first call in a hold status in response to specific code entered by the user to initiate a second call from the computer to an organizer of said voice message;

a switching portion to bridge the first call and second call, the switching portion being configured to change call information contained in a packet carrying voice information of the first call to the second call; and a releasing portion to release the bridge between the first call and the second call when a release signal is selected by the user to terminate the second call.

11. The computer of claim 10, wherein said switching portion is further configured to change call information contained in packet carrying voice information of the second call to correspond with the call information of the first call when the packet is sent from the second call to a first call.

12. The computer of claim 10, wherein said releasing portion releases the bridge between the first call and the second call when a dual tone multi-frequency signal entered to terminate the second call is detected at said listening portion.

13. The computer of claim 10, wherein a real-time transport protocol is used to send the packet over a packet switched network.

14. The computer of claim 10, wherein the call information comprises:

a destination address, and a synchronization source identifier.

15. The computer of claim 14, wherein the destination address of the packet is changed in an Internet Protocol header field.

16. The computer of claim 14, wherein the synchronization source identifier of the packet is modified in a real-time transfer protocol header.

17. The computer of claim 10, wherein said specific code includes dual tone multi-frequency signals.

18. A computer-readable medium encoded with a program, said program comprising:

placing a first call to a designated number to retrieve a voice message from a server over a packet switched network;

retrieving said voice message from said server;

entering a specific code to prompt said server to call an organizer of said retrieved voice message;

placing a second call, via said server, to said originator of the retrieved voice message, and changing call information of a packet carrying voice information of said first call correspond with call information of said second call when the packet is sent from the first call to the second call;

wherein said program further cause said server to change call information of a packet carrying voice information of the second call to correspond to call information of the first call when the packet is sent from the second call to the first call.

19. The computer-readable medium of claim 18, wherein said program further comprising:

converting said first call to use an Internet Protocol at said computer.

20. The computer-readable medium of claim 19, wherein the converting includes changing pulse code modulation continuous speech data to encoded audio packets.

21. The computer-readable medium of claim 18, wherein a real-time transport protocol is used to send the packet over the packet switched network.

22. The computer-readable medium of claim 18, wherein the call information comprises:

a destination address; and a source synchronization identifier.

23. The computer-readable medium of claim 22, wherein the destination address of the packet is changed in an Internet Protocol header first.

24. The computer-readable medium of claim 22, wherein the synchronization source identifier is changed in a real-time transfer protocol header.

25. The computer-readable medium of claim 18, wherein said program further comprising placing said first call in a hold status when said second call is made via said server.

26. The computer-readable medium of claim 18, wherein said specific code to prompt the computer includes dual tome multi-frequency signals.

* * * * *

UNITED STATES PATENT AND TRADEMARK OFFICE
CERTIFICATE OF CORRECTION

PATENT NO. : 6,842,452 B1
DATED : January 11, 2005
INVENTOR(S) : Muller

It is certified that error appears in the above-identified patent and that said Letters Patent is hereby corrected as shown below:

Column 5,
Line 8, before "specific", insert -- the --.

Signed and Sealed this

Tenth Day of May, 2005

JON W. DUDAS
*Director of the United States Patent and Trademark Office*